(12) United States Patent
Baek et al.

(10) Patent No.: US 10,138,768 B2
(45) Date of Patent: Nov. 27, 2018

(54) SYSTEM FOR CONTROLLING CONTINUOUSLY VARIABLE VALVE DURATION AND OPERATING METHOD THEREOF

(71) Applicant: HYUNDAI KEFICO CORPORATION, Gunpo, Gyeonggi-do (KR)

(72) Inventors: Jin Wook Baek, Gyeonggi-do (KR); Nam Kyu Kim, Seoul (KR)

(73) Assignee: HYUNDAI KEFICO CORPORATION, Gunpo, Gyeonggi-do (KR)

( * ) Notice: Subject to any disclaimer, the term of this patent is extended or adjusted under 35 U.S.C. 154(b) by 49 days.

(21) Appl. No.: 15/623,880

(22) Filed: Jun. 15, 2017

(65) Prior Publication Data

US 2017/0362968 A1 Dec. 21, 2017

(30) Foreign Application Priority Data

Jun. 15, 2016 (KR) .................. 10-2016-0074479

(51) Int. Cl.
| | | |
|---|---|---|
| F01L 1/34 | (2006.01) |
| F01L 13/00 | (2006.01) |
| F02D 13/02 | (2006.01) |
| F02D 41/00 | (2006.01) |
| F02D 41/22 | (2006.01) |

(Continued)

(52) U.S. Cl.
CPC .......... *F01L 13/0015* (2013.01); *F02D 13/02* (2013.01); *F02D 13/0219* (2013.01); *F02D 41/0002* (2013.01); *F02D 41/0097* (2013.01); *F02D 41/22* (2013.01); *F02D 41/266* (2013.01); *F01L 2013/111* (2013.01); *F02D 2041/001* (2013.01); *F02D 2041/1409* (2013.01); *F02D 2041/2027* (2013.01); *F02D 2200/101* (2013.01)

(58) Field of Classification Search
CPC ................. F02D 41/0097; F02D 41/22; F02D 2041/1409; F02D 2041/2027; F01L 13/0015; F01L 2013/111
USPC ........................................... 123/90.15, 90.17
See application file for complete search history.

(56) References Cited

U.S. PATENT DOCUMENTS

| | | | |
|---|---|---|---|
| 9,777,604 B2 * | 10/2017 | Pietrzyk | F01L 1/34409 123/90.15 |
| 2013/0146006 A1 | 6/2013 | Kim et al. | |
| 2016/0153324 A1 | 6/2016 | Kwon et al. | |

FOREIGN PATENT DOCUMENTS

| | | |
|---|---|---|
| JP | 2009-085139 A | 4/2009 |
| JP | 2011-196300 A | 10/2011 |

(Continued)

*Primary Examiner* — Ching Chang
(74) *Attorney, Agent, or Firm* — Mintz Levin Cohn Ferris Glovsky and Popeo, P.C.; Kongsik Kim

(57) ABSTRACT

A control system of a continuously variable valve duration (CVVD) is provided. A system for controlling a CVVD by adjusting an actuator for controlling the CVVD includes an electronic control unit (ECU) configured to output a command for adjusting the actuator based on a vehicle state and a cam position sensor is configured to measure a cam revolutions per minute (RPM). A controller is configured to calculate a crank RPM from the cam RPM when a failure occurs during communication with the ECU. A target phase angle is extracted based on the calculated crank RPM, and an electric current is output that corresponds to the extracted target phase angle to the actuator.

8 Claims, 5 Drawing Sheets

(51) Int. Cl.
   *F02D 41/26*   (2006.01)
   *F02D 41/14*   (2006.01)
   *F02D 41/20*   (2006.01)

(56) References Cited

FOREIGN PATENT DOCUMENTS

| | | |
|---|---|---|
| KR | 10-2005-0063228 A | 6/2005 |
| KR | 10-2013-0063819 A | 6/2013 |
| KR | 2015-0027878 A | 3/2015 |
| KR | 2016-0064847 A | 6/2016 |

\* cited by examiner

FIG. 2

| LOAD \ CRANK RPM | 650 | 800 | 1000 | 1500 | 2000 | 2500 | 3000 | 3500 | 4000 | 4500 | 4800 | 5000 | 5500 | 6000 | 6200 | 6500 |
|---|---|---|---|---|---|---|---|---|---|---|---|---|---|---|---|---|
| 11.61 | 15 | 25 | 25 | 25 | 25 | 20 | 25 | 25 | 25 | 25 | 15 | 15 | 15 | 5 | 0 | 0 |
| 15.47 | 15 | 25 | 25 | 25 | 25 | 20 | 25 | 25 | 25 | 25 | 15 | 15 | 15 | 5 | 0 | 0 |
| 19.34 | 15 | 25 | 25 | 25 | 25 | 20 | 25 | 25 | 25 | 25 | 15 | 15 | 15 | 5 | 0 | 0 |
| 23.21 | 15 | 25 | 30 | 25 | 25 | 20 | 25 | 25 | 25 | 25 | 15 | 15 | 15 | 5 | 0 | 0 |
| 30.94 | 15 | 25 | 30 | 20 | 25 | 20 | 25 | 25 | 25 | 25 | 15 | 15 | 15 | 5 | 0 | 0 |
| 38.68 | 15 | 25 | 30 | 20 | 25 | 20 | 25 | 25 | 25 | 25 | 15 | 15 | 15 | 5 | 0 | 0 |
| 46.42 | 5 | 20 | 20 | 20 | 20 | 15 | 15 | 15 | 15 | 15 | 5 | 5 | 5 | 5 | 0 | 0 |
| 61.89 | 5 | 5 | 5 | 15 | 15 | 15 | 5 | 5 | 5 | 5 | 5 | 5 | 5 | 0 | 0 | 0 |
| 77.36 | -5 | -5 | -5 | 0 | 5 | 5 | -5 | -5 | -5 | -5 | -5 | -5 | -5 | -5 | 0 | 0 |
| 85.1 | -15 | -15 | -15 | -15 | -5 | -10 | -15 | -15 | -15 | -15 | -15 | -15 | -15 | -5 | 0 | 0 |
| 92.84 | -25 | -45 | -37.5 | -17 | -17 | -17 | -17 | -17 | -17 | -17 | -17 | -15 | -20 | -15 | -10 | -5 |
| 108.31 | -25 | -45 | -37.5 | -17 | -17 | -17 | -17 | -17 | -17 | -17 | -17 | -15 | -20 | -15 | -10 | -5 |

FIG. 4

| CRANK RPM | | | | | | | | | | | | | | |
|---|---|---|---|---|---|---|---|---|---|---|---|---|---|---|
| | 650 | 800 | 1000 | 1500 | 2000 | 2500 | 3000 | 3500 | 4000 | 4500 | 4800 | 5000 | 5500 | 6000 | 6200 | 6500 |
| FAULT | 15 | 20 | 20 | 20 | 20 | 15 | 15 | 15 | 15 | 15 | 5 | 5 | 5 | 5 | 0 | 0 |

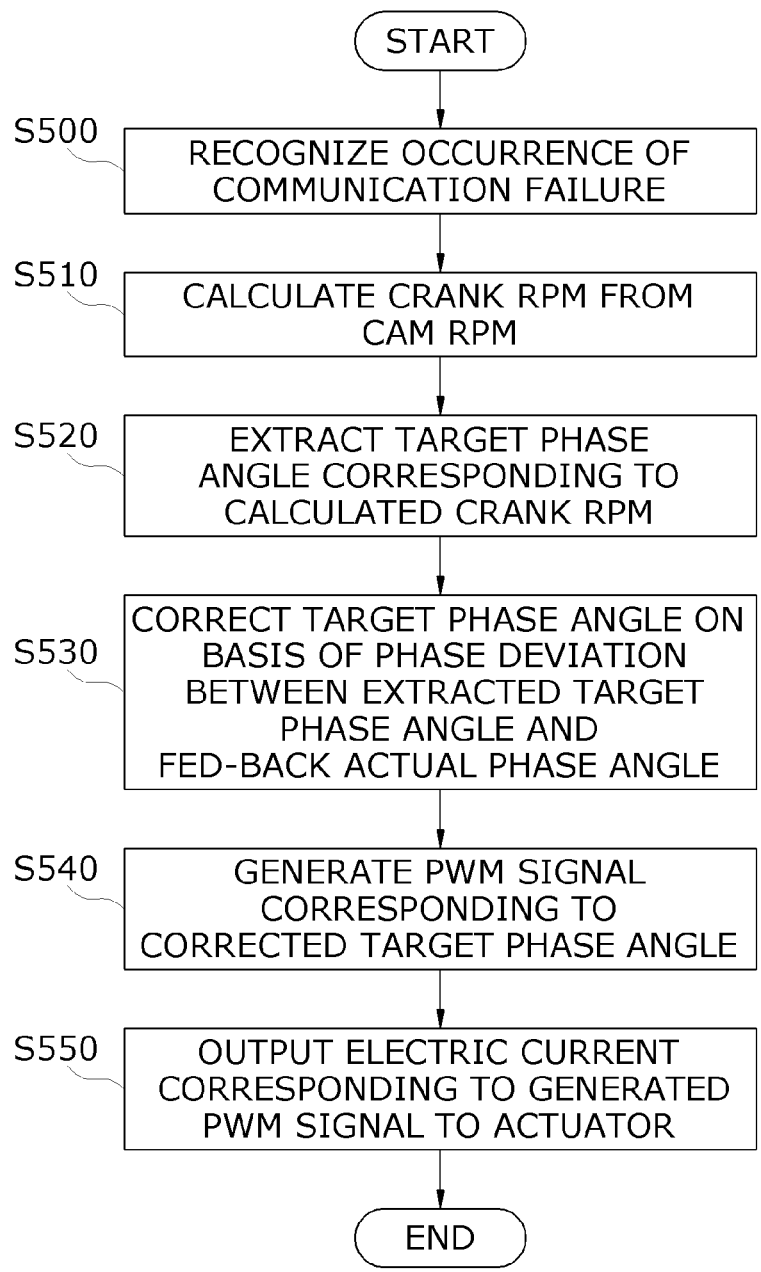

SYSTEM FOR CONTROLLING CONTINUOUSLY VARIABLE VALVE DURATION AND OPERATING METHOD THEREOF

CROSS-REFERENCE TO RELATED APPLICATION

This application claims priority to and the benefit of Korean Patent Application No. 10-2016-0074479, filed on Jun. 15, 2016, the disclosure of which is incorporated herein by reference in its entirety.

BACKGROUND

1. Field of the Disclosure

The present disclosure relates to control of a continuously variable valve duration (CVVD), and more particularly, to a system for controlling a CVVD, to enable a CVVD controller to actively control a CVVD when a communication failure occurs between the CVVD controller and an electronic control unit (ECU), and an operating method thereof.

2. Description of the Related Art

Generally, an internal combustion engine is configured to generate power by receiving and burning fuel and air in a combustion chamber. When air is suctioned, an intake valve is actuated by a camshaft being driven, and the air is suctioned into a combustion chamber while the intake valve is open. Additionally, an exhaust valve is actuated when the camshaft is driven, and the air is discharged from the combustion chamber while the exhaust valve is open. However, an optimal operation for the intake value or exhaust valve changes based on a rotational speed of an engine. In other words, an appropriate valve-opening or closing timing changes depending on the rotational speed of the engine.

In order to realize optimize the valve operation according to the rotational speed of the engine, research has been conducted on a continuously variable valve lift (CVVL) apparatus configured to design a plurality of cams to drive a valve or operate the valve by using a different lift based on the number of revolutions of an engine. Continuously variable valve timing (CVVT) technology has been developed to adjust an opening timing of the valve. This is a technology in which a valve opening timing and a valve closing timing are simultaneously adjusted while a valve duration is fixed. A conventional CVVL or CVVT apparatus has problems in terms of a complex configuration and a high cost.

Thus, research and development have been conducted on a continuously variable valve duration (CVVD) apparatus that may adjust a valve duration using a simple configuration to enhance fuel efficiency and performance of an engine. A CVVD apparatus includes an actuator for selectively varying a rotational center position of a cam and a controller for adjusting the actuator. The controller adjusts the actuator according to a command received from an electronic control unit (ECU). Therefore, when a communication failure occurs between the ECU and the controller because of a disconnection, the controller cannot receive a command from the ECU. Thus, normal control cannot be performed on the actuator.

The above information disclosed in this section is merely for enhancement of understanding of the background of the disclosure and therefore it may contain information that does not form the prior art that is already known in this country to a person of ordinary skill in the art.

SUMMARY

The present disclosure provides a system for controlling a continuously variable valve duration (CVVD). The system provides a controller for a CVVD that actively adjusts the CVVD when a communication failure occurs between the controller and an electronic control unit (ECU), and an operating method thereof.

According to an exemplary aspect of the present disclosure, system for controlling a CVVD by adjusting an actuator for controlling the CVVD, may include an ECU configured to output a command for adjusting the actuator based on a vehicle state; a cam position sensor configured to measure a cam revolutions per minute (RPM); and a controller configured to calculate a crank RPM from the cam RPM when a failure occurs during communication with the ECU, extract a target phase angle based on the calculated crank RPM, and output an electric current corresponding to the extracted target phase angle to the actuator.

The controller may include a first interface configured to communicate with the ECU; a second interface configured to receive the cam RPM through communication with the cam position sensor; a storage unit configured to store a control table composed of a target phase angle for each crank RPM; an emergency control unit configured to calculate the crank RPM from the cam RPM when a failure occurs during communication with the ECU, extract a target phase angle matching the calculated crank RPM from the control table, and output the extracted target phase angle; a proportional-integral-differential (PID) control unit configured to adjust the extracted target phase angle on the basis of a phase deviation between the extracted target phase angle and an actual phase angle received from the actuator, and provide the corrected target phase angle; a pulse width modulation (PWM) generation unit configured to output a PWM signal corresponding to the target phase angle provided by the PID control unit; and a driver configured to output an electric current corresponding to the PWM signal.

The first interface may be configured to notify the emergency control unit that the failure occurred when a failure occurs during communication with the ECU. The emergency control unit may be configured to calculate the crank RPM from the cam RPM using an equation of "cam RPM=2× crank RPM." The first interface may be configured to receive the target phase angle provided by the ECU and provide the received target phase angle to the PID control unit when communication with the ECU is normal.

According to another exemplary aspect of the present disclosure, an operating method of a system for controlling a CVVD by a controller adjusting an actuator for controlling the CVVD according to a target phase angle originating from an ECU, may include calculating a crank RPM from a cam RPM when a communication failure occurs between the ECU and the controller; extracting a target phase angle that corresponds to the calculated crank RPM from a control table; and outputting an electric current for adjusting the actuator based on the extracted target phase angle.

The calculating may include calculating the crank RPM from the cam RPM using an equation of "cam RPM=2× crank RPM." The outputting of an electric current may include adjusting the extracted target phase angle based on a phase deviation between the extracted target phase angle and an actual phase angle received from the actuator; generating a PWM signal corresponding to the adjusted target phase angle; and outputting an electric current corresponding to the PWM signal to the actuator.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 2 is an exemplary diagram showing an example of a control table stored in an electronic control unit (ECU) according to an exemplary embodiment of the present invention;

FIG. 4 is an exemplary diagram showing an example of a control table stored in a controller according to an exemplary embodiment of the present invention; and FIG. 5 is an exemplary flowchart showing an operational sequence of the system for controlling a CVVD according to an exemplary embodiment of the present disclosure.

DETAILED DESCRIPTION

Figure 1:
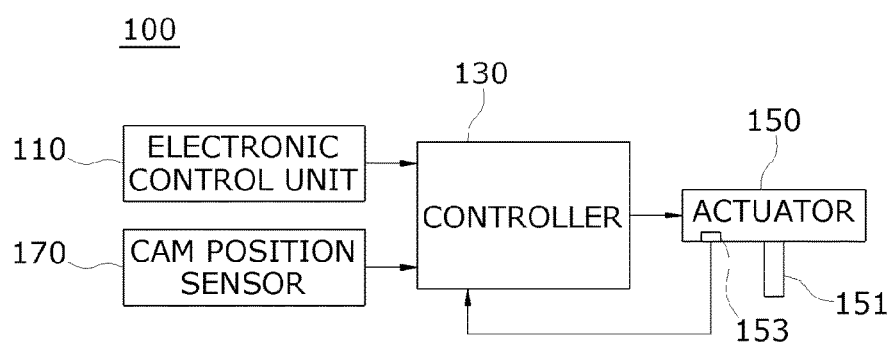
FIG. 1 is an exemplary diagram showing a configuration of a system for controlling a continuously variable valve duration (CVVD) according to an exemplary embodiment of the present invention.

Various example embodiments will now be described more fully with reference to the accompanying drawings in which only some example embodiments are shown. Specific structural and functional details disclosed herein are merely representative for the purpose of describing example embodiments. However, the present disclosure may be embodied in many alternate forms and is not to be construed as being limited to only the example embodiments set forth herein.

Accordingly, while example embodiments of the disclosure are capable of various modifications and alternative forms, embodiments thereof are shown by way of example in the drawings and will herein be described in detail. However, it should be understood that there is no intent to limit example embodiments of the present disclosure to the particular forms disclosed. Conversely, example embodiments are to cover all modifications, equivalents, and alternatives falling within the scope of the disclosure.

It should be understood that, although the terms first, second, etc. may be used herein to describe various elements, these elements are not limited by these terms. These terms are only used to distinguish one element from another. For example, a first element could be termed a second element, and, similarly, a second element could be termed a first element, without departing from the scope of example embodiments of the present disclosure.

It should be understood that when an element is referred to as being "connected" or "coupled" to another element, the element can be directly connected or coupled to the other element or intervening elements may be present. Conversely, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween. It should also be noted that in some alternative implementations, functions/acts noted in a specific block may occur out of the order noted in a flowchart. For example, two blocks shown in succession may in fact be executed substantially concurrently or may sometimes be executed in a reverse order depending upon functionality/acts involved.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Hereinafter, a system for controlling a continuously variable valve duration (CVVD) and an operating method thereof according to an exemplary embodiment of the present disclosure will be described in detail with reference to the accompanying drawings.

FIG. 1 is an exemplary diagram showing a configuration of a system for controlling a CVVD according to an embodiment of the present disclosure, and FIG. 2 is a diagram showing an example of a control table stored in an electronic control unit (ECU) according to an embodiment of the present disclosure. Referring to FIG. 1, the system for controlling a CVVD according to an embodiment of the present disclosure (hereinafter referred to as a "system" 100) may include an ECU 110, a controller 130, an actuator 150, and a cam position sensor 170. The system 100 may be configured to adjust a duration of a continuously variable valve and may implement a long duration or a short duration for the continuously variable valve (hereinafter referred to as a "valve") under control of the system 100.

In particular, in order to more stably control the actuator 150, the system 100 may be implemented to enable the controller 130 to actively adjust the actuator 150 without depending on a command originating from the ECU 110 when a communication failure occurs between the ECU 110 and the controller 130. The ECU 110 communicates with the controller 130 through a vehicle network communication method such as controller area network (CAN) communication and stores a control table that is preset according to a vehicle state, such as the number of revolutions (a crank revolutions per minute (RPM)) of an engine, a load state of a vehicle, etc.

As shown in FIG. 2, the control table may include phase angles corresponding to the number of revolutions (the crank RPM) of the engine and the load state of the vehicle, and the ECU 110 provides an appropriate command to the controller 130 depending on the vehicle state. In other words the ECU 110 may extract a phase angle from the control table based on the vehicle state and may provide the extracted phase angle to the controller 130. The phase angle is referred to as a "target phase angle." As an example, the ECU 110 extracts the phase angle using the control table as shown in FIG. 2. For example, when a load value is "23.21" and a crank RPM is 4,000, the ECU 110 extracts "25" from the control table and provides the extracted "25" to the controller 130 as the target phase angle.

The controller 130 may be configured to receive the target phase angle from the ECU 110 and outputs an electric current based on of the target phase angle to the actuator 150 to adjust the actuator 150. In other words, the controller 130 may be configured to adjust the target phase angle provided by the ECU 110 based on a phase deviation between the provided target phase angle and an actual phase angle received from the actuator 150, and outputs an electric current based on the "adjusted target phase angle." When the controller 130 determines that a failure has occurred during communication with the ECU 110, the controller 130 may be configured to calculate a crank RPM based on a cam RPM input from the cam position sensor 170, and adjusts the actuator 150 based on the calculated crank RPM.

Additionally, the controller 130 may store a control table including a target phase angle for each crank RPM, extracts a target phase angle matching the calculated crank RPM from the control table, and outputs an electric current based on the extracted phase angle to the actuator 150 to control the actuator 150. For example, the controller 130 may be configured to adjust the extracted target phase angle on the basis of a phase deviation between the extracted target phase angle and the actual phase angle received from the actuator 150, and outputs an electric current based on the "corrected target phase angle." In other words, the controller 130 may be configured to control the actuator 150 according to a command originating from the ECU 110 when communication with the ECU 110 is normal and may actively adjust the actuator 150 using the crank RPM calculated based on the cam RPM when a failure occurs during communication with the ECU 110.

A detailed configuration of the controller 130 will be described below with reference to FIGS. 3 and 4. The actuator 150 may be configured to operate based on an output electric current originating from the controller 130 to adjust a duration of a continuously variable valve. In other words, the actuator 150 may include a control shaft 151 interoperable with a camshaft (not shown) to adjust the continuously variable valve, and the actuator 150 adjusts the duration of the continuously variable valve to control a phase angel of the control shaft 151.

Further, the actuator 150 may include a phase angle detection unit 153 to detect the phase angle of the control shaft 151, and the phase angle detection unit 153 detects the phase angle of the control shaft 151 and provides the detected phase angle to the controller 130. The cam position sensor 170 may be configured to measure a cam RPM and provides the measured cam PRM to the controller 130. Details regarding the measurement of the cam RPM using the cam position sensor 170 are well known, and thus a detailed description thereof will be omitted. The controller of the system for controlling a CVVD according to an exemplary embodiment of the present disclosure will be described below in detail with reference to FIGS. 3 and 4.

Figure 3:
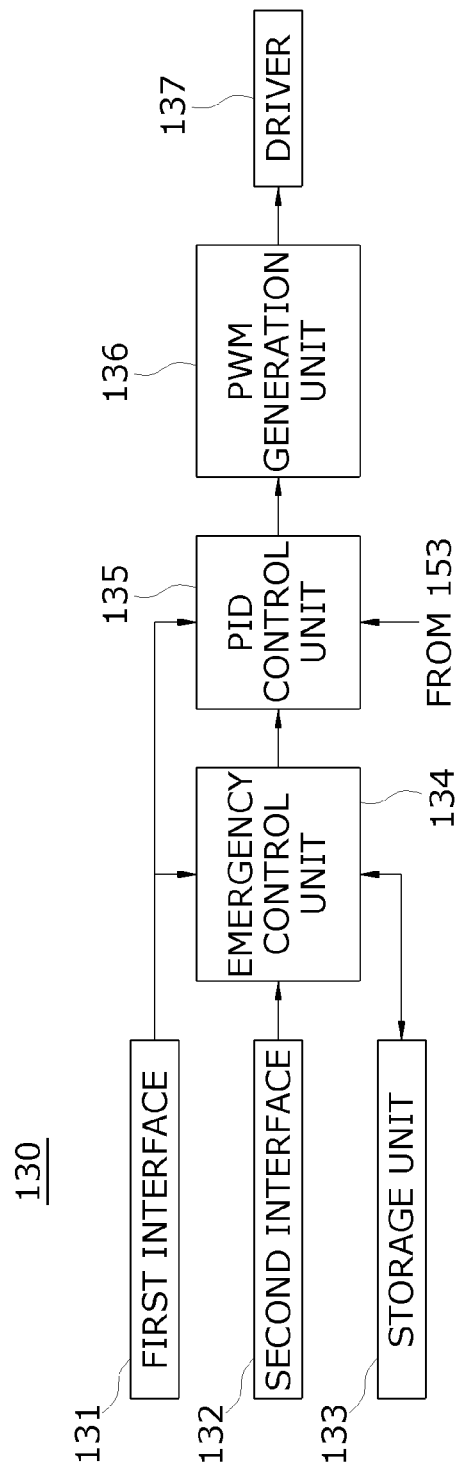
FIG. 3 is an exemplary diagram showing a configuration of a controller of a system for controlling a CVVD according to an exemplary embodiment of the present invention.

FIG. 3 is an exemplary diagram showing a configuration of the controller of the system for controlling a CVVD according to an embodiment of the present disclosure. FIG. 4 is an exemplary diagram showing an example of a control table stored in the controller according to an exemplary embodiment of the present disclosure. Referring to FIGS. 3 and 4, the controller 130 according to an exemplary embodiment of the present disclosure may include a first interface 131, a second interface 132, a storage unit 133, an emergency control unit 134, a proportional-integral-differential (PID) control unit 135, a pulse width modulation (PWM) generation unit 136, and a driver 137.

The first interface 131 may be configured to communicate with the ECU 110. When communication with the ECU 110 is normal, the first interface 131 may be configured to receive a command (e.g., a target phase angle) provided by the ECU 110 and provides the received command to the PID control unit 135. When a failure is detected during communication with the ECU 110, the first interface 131 may be configured to notify the emergency control unit 134 that the failure occurred.

The second interface 132 may be configured to be in communication with the cam position sensor 170 and provides a cam RPM originating from the cam position sensor 170 to the emergency control unit 134. The storage unit 133 may be configured to store a control table that is preset for operating the emergency control unit 134. As shown in FIG. 4, the control table may include a target phase angle for each crank RPM. For example, the storage unit 133 may be implemented as an electrically erasable programmable read-only memory (EEPROM) or various other types of memory.

The emergency control unit 134 may be configured to operate after receiving the notification that a failure occurred from the first interface 131 and provides a target phase angle using the cam RPM provided through the second interface 132 and the control table stored in the storage unit 133. In other words, when the notification that a failure occurred is received from the first interface 131, the emergency control unit 134 may be configured to calculate a crank RPM from the cam RPM provided by the second interface 132. For example, when the cam RPM is two times the crank RPM, and thus when the cam RPM is known, the crank RPM may be calculated therefrom.

Additionally, the emergency control unit 134 may be configured to extract a target phase angle matching the calculated crank RPM from the control table of the storage unit 133 and provides the extracted target phase angle to the PID control unit 135. For example, it is assumed that the emergency control unit 134 extracts a target phase angle using the control table as shown in FIG. 4. When the crank RPM calculated using the cam RPM is "2,500," the emergency control unit 134 extracts "15" as the target phase angle and provides "15" to the PID control unit 135.

When the target phase angel provided by the first interface 131 or the emergency control unit 134 is received, the PID control unit 135 may be configured to adjust the target phase angle based on a phase deviation between the target phase angle and an actual phase angle received from the actuator 150 and provides the corrected target phase angle to the PWM generation unit 136. The PWM generation unit 136 may be configured to generate a PWM signal corresponding to the "corrected target phase angle" and provides the generated PWM signal to the driver 137, and the driver 137 outputs an electric current corresponding to the PWM signal provided by the PWM generation unit 136 to the actuator 150.

Details regarding the generation of the PWM signal according to the "corrected target phase angle" and the output of the electric current corresponding to the generated PWM signal are generally well known to those skilled in the art, and thus detailed descriptions thereof will be omitted. The configuration of the system for controlling a CVVD according to an embodiment of the present disclosure has been described above. An operation of the system for controlling a CVVD according to an exemplary embodiment of the present disclosure will be described in detail below with reference to the accompanying drawings.

FIG. 5 is an exemplary flowchart showing an operational sequence of the system for controlling a CVVD according to an exemplary embodiment of the present disclosure. The operation of the system for controlling a CVVD according to an exemplary embodiment of the present disclosure will be described with reference to FIG. 5. However, a normal operation is associated with a well-known technique, and thus a detailed description thereof will be omitted. An abnormal operation, that is, a case in which the controller 130 does not normally receive a command (a target phase angle) from the ECU because a communication failure occurs between the ECU 110 and the controller 130, will be described.

First, when a communication failure occurs between the ECU 110 and the controller 130, the controller 130 may be configured to recognize the occurrence of the communication failure (S500). The recognition of the occurrence of the communication failure in S500 may be performed by the first interface 131, which communicates with the ECU 110, notifying the emergency control unit 134 that the communication failure occurred. Additionally, the controller 130 may be configured to calculate a crank RPM from a cam RPM measured by the cam position sensor 170 and provided through the second interface 132 (S510) and extracts a target phase angle corresponding to the calculated crank RPM from a control table of the storage unit 133 (S520).

Subsequently, the controller 130 may be configured to adjust the extracted target phase angle on the basis of a phase deviation between the extracted target angle and an actual phase angle received from the actuator 150 (S530). Subsequently, the controller 130 may be configured to generate a PWM signal corresponding to the corrected target phase angle (S540) and outputs an electric current corresponding to the generated PWM signal to the actuator 150 (S550). According to the configuration of the system according to an exemplary embodiment of the present disclosure, the controller may control a CVVD based on a cam RPM and a target phase angle for each crank RPM even when the controller does not receive a command from an ECU because a communication failure occurred between the controller and the ECU.

Accordingly, even when a communication failure occurs between the controller and the ECU, the controller may actively control the CVVD without depending on the command originating from the ECU. Accordingly, according to the system of the present disclosure, a more stable control of an actuator for controlling a CVVD by adjusting the actuator may be provided.

Even though all of the components of the above-described exemplary embodiment of the present disclosure may be combined as one component or operate in combination, the disclosure is not limited to the embodiment. In other words, all of the components may be selectively combined as one or more components to operate within the scope of the disclosure. Also, each component may be implemented with one independent hardware device, but some or all of the components may be selectively combined and implemented as a computer program having a program module for performing some or all functions combined in one or more hardware devices. Further, such a computer program may be stored in a computer-readable recording medium such as a universal serial bus (USB) memory, a compact disc (CD), a flash memory, or the like. The embodiment of the present disclosure may be implemented by reading and executing the computer program. Examples of the computer-readable recording medium may include a magnetic recording medium, an optical recording medium, a carrier wave medium, and the like.

The system for controlling a CVVD and the operating method thereof according to the present disclosure have been described with reference to exemplary embodiments. However, the present disclosure is not limited to the exemplary embodiment, and it should be apparent to those skilled in the art that various alternatives, modifications, and variations can be made therein without departing from the spirit and scope of the present disclosure.

Accordingly, the embodiment and the accompany drawings of the present disclosure are to be considered descriptive and not restrictive of the disclosure, and do not limit the technical scope of the disclosure. The scope of the disclosure should be construed by the appended claims, and all technical ideas within the scope of their equivalents should be construed as being included in the scope of the disclosure.

What is claimed is:

1. A system for controlling a continuously variable valve duration (CVVD) by adjusting an actuator for controlling the CVVD, comprising:
    an electronic control unit (ECU) configured to output a command to adjust the actuator based on a vehicle state;
    a cam position sensor configured to measure a cam revolutions per minute (RPM); and
    a controller configured to calculate a crank RPM from the cam RPM when a failure occurs during communication with the ECU, extract a target phase angle based on the calculated crank RPM, and output an electric current corresponding to the extracted target phase angle to the actuator.

2. The system of claim 1, wherein the controller comprises:
    a first interface configured to communicate with the ECU;
    a second interface configured to receive the cam RPM through communication with the cam position sensor;
    a storage unit configured to store a control table having a target phase angle for each crank RPM;
    an emergency control unit configured to calculate the crank RPM from the cam RPM when a failure occurs during communication with the ECU, extract a target phase angle that corresponds to the calculated crank RPM from the control table, and output the extracted target phase angle;

a proportional-integral-differential (PID) control unit configured to adjust the extracted target phase angle based on a phase deviation between the extracted target phase angle and an actual phase angle received from the actuator, and provide the adjusted target phase angle;

a pulse width modulation (PWM) generation unit configured to output a PWM signal corresponding to the target phase angle provided by the PID control unit; and a driver configured to output an electric current corresponding to the PWM signal.

3. The system of claim 2, wherein the first interface is configured to notify the emergency control unit when a failure occurs during communication with the ECU.

4. The system of claim 2, wherein the emergency control unit is configured to calculate the crank RPM from the cam RPM using an equation of "cam RPM=2×crank RPM."

5. The system of claim 2, wherein the first interface is configured to receive the target phase angle provided by the ECU and provide the received target phase angle to the PID control unit when communication with the ECU is normal.

6. An operating method of a system for controlling a CVVD by a controller adjusting an actuator for controlling the CVVD according to a target phase angle originating from an ECU comprising:

calculating, by the controller, a crank RPM from a cam RPM when a communication failure occurs between the ECU and the controller;

extracting, by the controller, a target phase angle that corresponds to the calculated crank RPM from a control table; and outputting, by the controller, an electric current for adjusting the actuator on the basis of the extracted target phase angle.

7. The operating method of claim 6, wherein the calculating comprises calculating the crank RPM from the cam RPM using an equation of "cam RPM=2×crank RPM."

8. The operating method of claim 6, wherein the outputting of an electric current comprises:

correcting, by the controller, the extracted target phase angle based on a phase deviation between the extracted target phase angle and an actual phase angle received from the actuator;

generating, by the controller, a PWM signal corresponding to the corrected target phase angle; and outputting, by the controller, an electric current corresponding to the PWM signal to the actuator.

* * * * *